Feb. 18, 1930.  L. F. NENNINGER  1,747,903
MACHINE TOOL CONTROL
Filed June 7, 1924   6 Sheets-Sheet 6

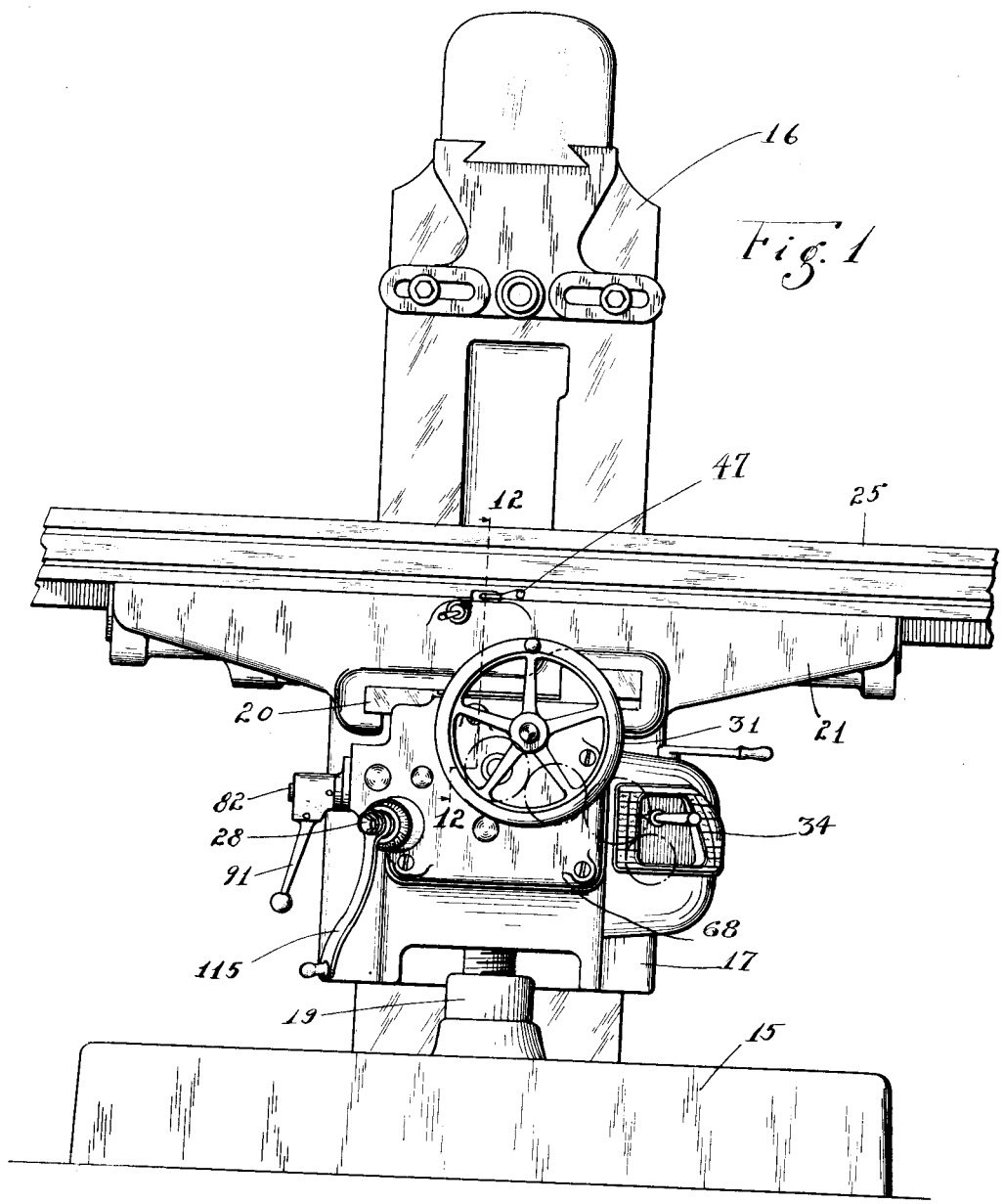

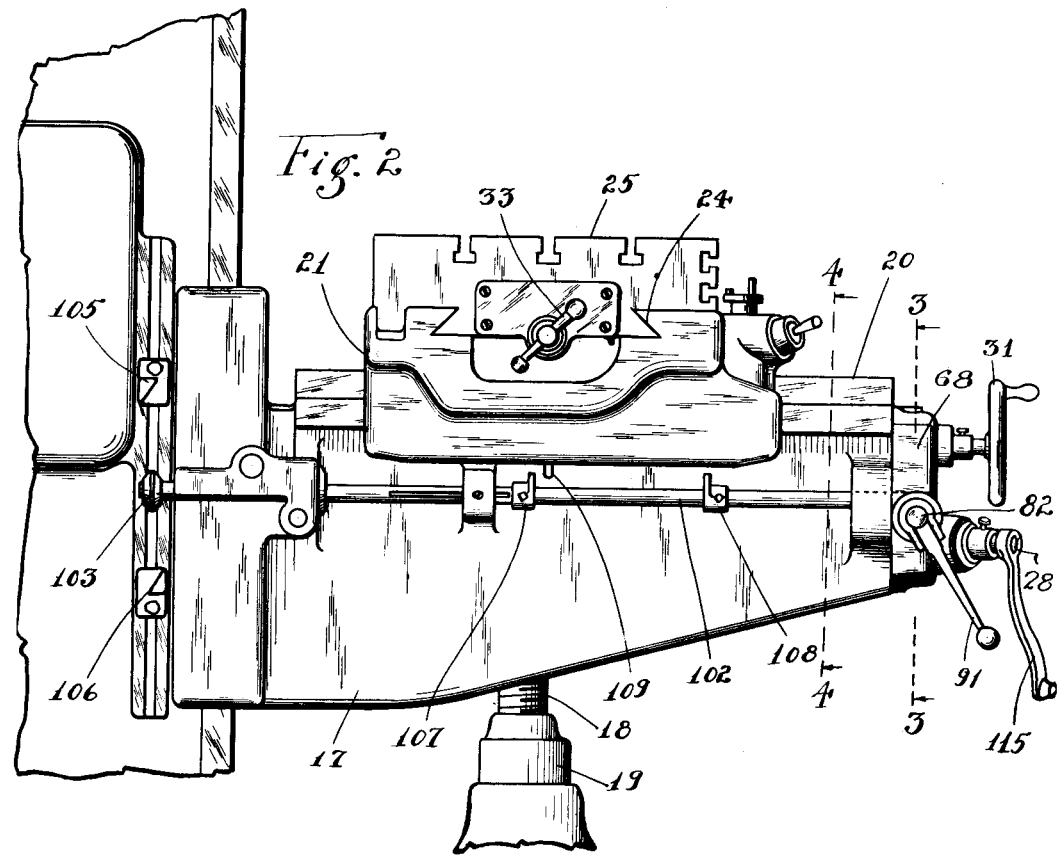
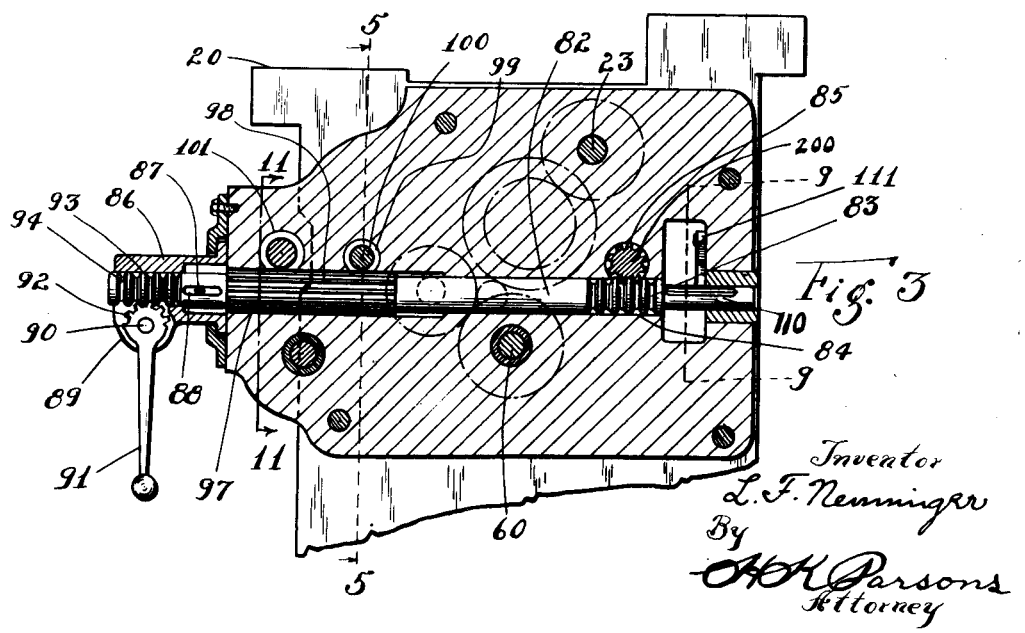

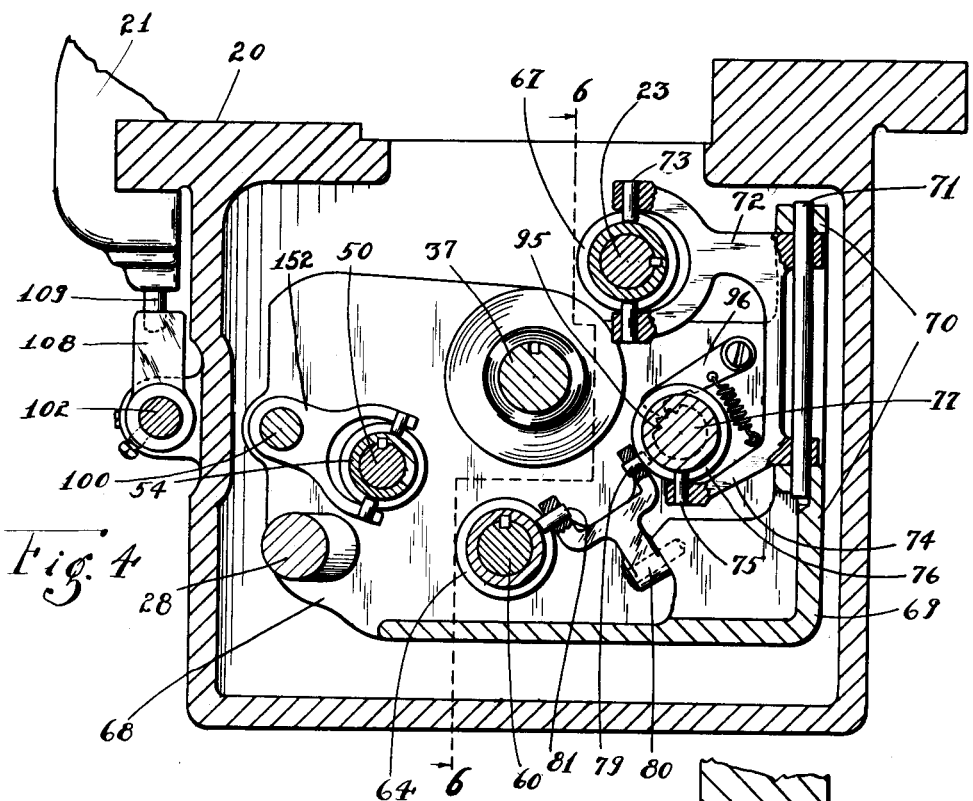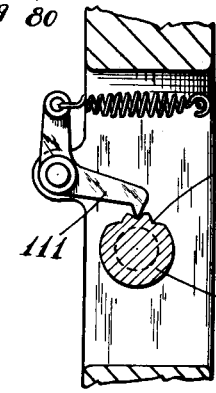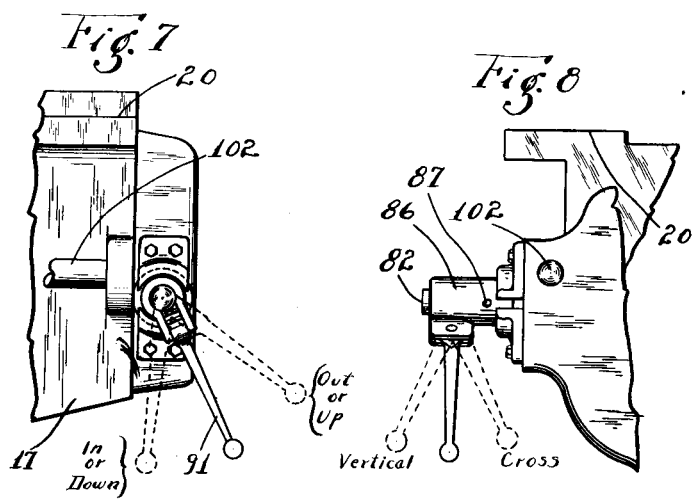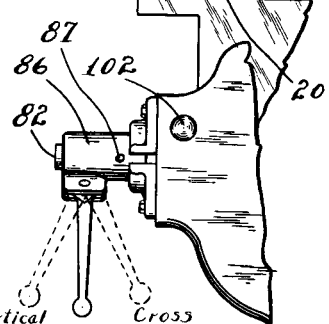

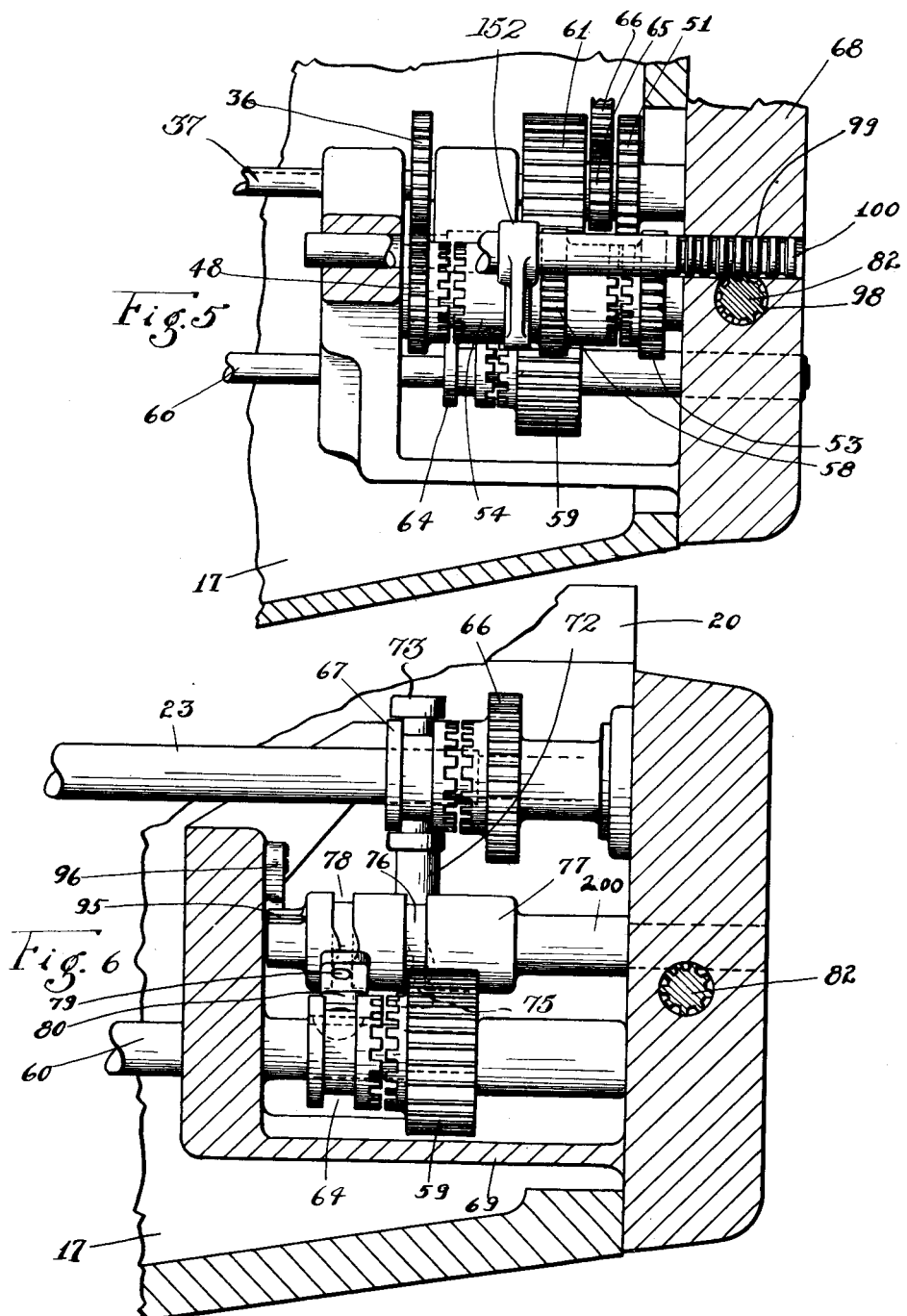

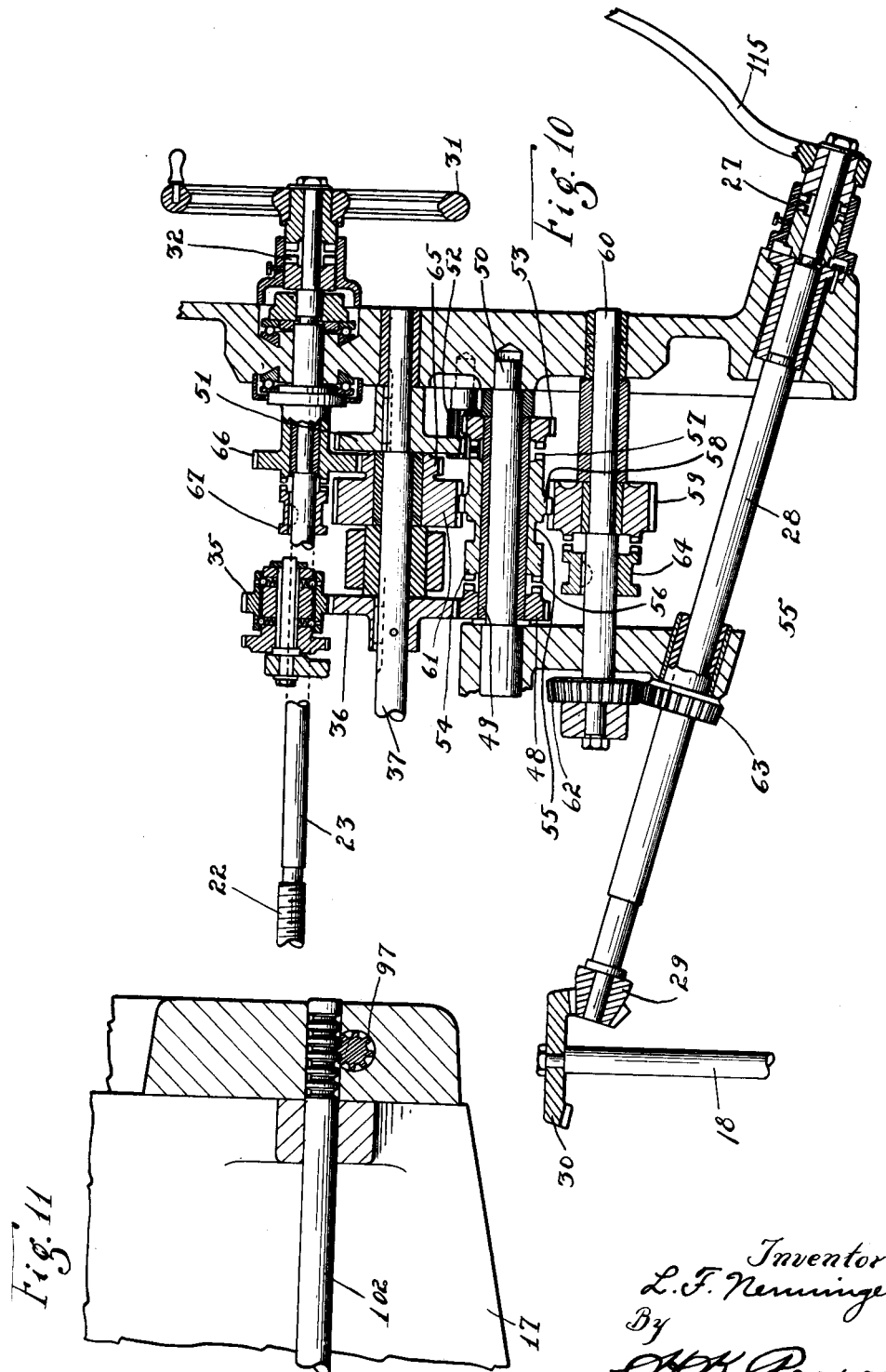

Inventor
L. F. Nenninger
By
A. K. Parsons
Attorney

Patented Feb. 18, 1930

1,747,903

UNITED STATES PATENT OFFICE

LESTER F. NENNINGER, OF CINCINNATI, OHIO, ASSIGNOR TO THE CINCINNATI MILLING MACHINE COMPANY, OF CINCINNATI, OHIO, A CORPORATION OF OHIO

MACHINE-TOOL CONTROL

Application filed June 7, 1924. Serial No. 718,640.

This invention relates to improvements in machine tools and more particularly to the mechanism for controlling the operation thereof.

As illustrated, it is shown applied to a milling machine, of what is commonly termed the knee and column type, that is to say, a machine having a rigid column in combination with a vertically movable knee or work supporting member, which slidably supports a transversely movable saddle, on which is mounted a longitudinally shiftable work table.

The important feature in connection with machinery of this type, for example, is that there be as few control members as possible for regulating the movement of the several parts in adjusting the machine for particular work, and to control the movements thereof during the performance of the work operations.

A further desirable feature is, that such control members as are employed be readily accessible to the operator when in position to best view the work being performed by the machine. Incidentally, as the several movements are preferably power actuated, it is very desirable that some type of automatic control device be provided in addition to the manual control devices to prevent damage to the various parts of the machine, due to being power driven at the limits of their stroke. Such automatic controls should preferably be capable of adjustment to check the operation of the machine at the completion of the work movement necessary for the particular work.

One of the objects of the present invention, therefore, is the provision of an improved simplified control for certain of the power shifting mechanisms of a machine of this type which will greatly simplify and facilitate the operation of the machine.

A further object of the invention is the provision of a single lever control mechanism, which shall be directional in nature and shall govern both the direction of independent movement of at least two of the relatively movable parts as respects their main support, the base, and which shall in addition control the starting, stopping and reversing of said movements.

Broadly speaking, the invention includes a transmission line, a main power drive mechanism therefor, a branch line therefrom having an independent start, stop and reverse mechanism for one of the shiftable elements, a common reverser and control for certain of the other movements, and means for selectively connecting the final mover of either of said other elements, with the power line and reverser.

The invention further contemplates a single control member coupled with said common reverser and selective shaft member which shall effect both the selective engagements and the directional coupling of the movements with the power mechanism. In the specific embodiment of the invention here illustrated, said control member comprises an oscillatable, longitudinal movable spindle, shifting mechanism associated therewith, manual means for effecting both of said movements of the spindle, and additional means for automatically effecting one of said movements.

In the drawings is shown a conventional type of milling machine embodying the generic principles and accomplishing the desirable results above referred to, but it is to be understood that the present mechanism is capable of application to other types of machine tools or the like, and that I may make any modifications in the specific details of construction and combination and arrangement of parts hereinafter described within the scope of the appended claims without departing from or exceeding the spirit of the invention.

Figure 1 is a front view of a milling machine, embodying these improvements.

Figure 2 is an enlarged side elevation of the knee and parts supported thereby, the remainder of the machine being fragmentarily shown.

Figure 3 is a sectional view on the line 3—3 of Figure 2.

Figure 4 is a sectional view on the line 4—4 of Figure 2.

Figure 5 is a section on the line 5—5 of Figure 3.

Figure 6 is a section on the line 6—6 of Figure 4.

Figure 7 is a fragmentary view, illustrating in dotted lines, certain directional adjustments of the control lever.

Figure 8 is a similar front view, illustrating certain selective adjustments thereof.

Figure 9 is a fragmentary section on line 9—9 of Figure 3.

Figure 10 is a sectional development of a portion of the power transmission line and shiftable gear elements thereof.

Figure 11 is a sectional view on the line 11—11 of Figure 3.

Figure 12:
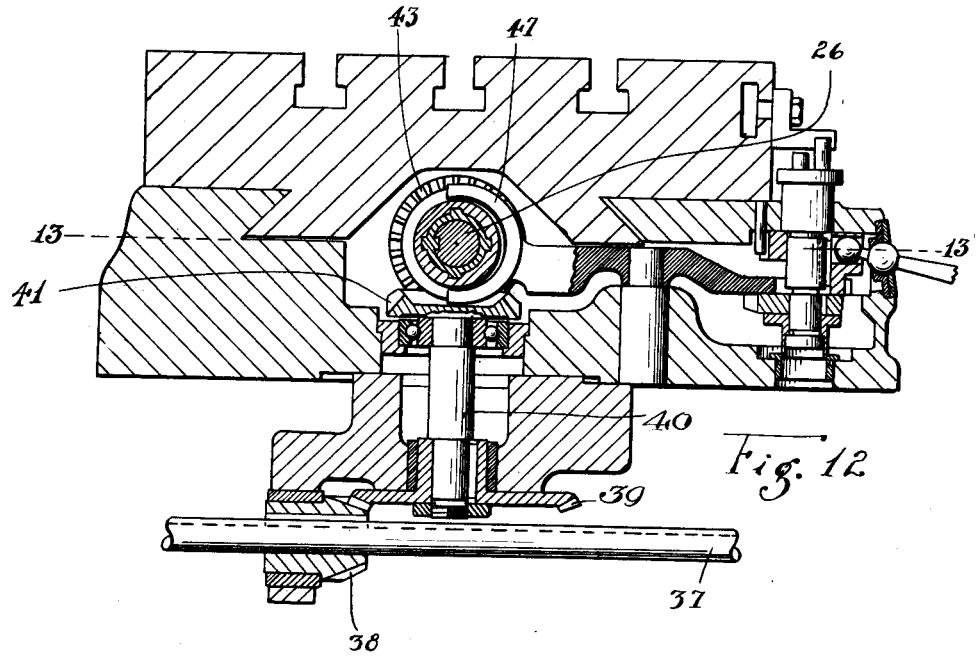
Figure 12 is a section on line 12—12 of Figure 1.

In the drawings, in which similar characters of reference are employed to denote corresponding parts throughout the several views, the numeral 15 designates the base of a milling machine having rising therefrom a column 16 on which is slidably mounted the knee 17. Adjusting screw 18 carried by the knee and operating in a nut portion 19 rising from the base 15, serves to vary the vertical position of the knee as respects the base and column. The knee is provided with transverse slide-ways 20 on which is movable the saddle 21, shiftable by suitable mechanism including a final mover, illustrated as an adjusting screw portion 22 on shaft 23. This saddle in turn is formed with the guides 24 for the work support table 25 whose final mover is shown in the form of an adjusting screw 26.

It is to be understood that these parts may be of any conventional type and any other form of final mover substituted for the one here particularly shown. It will be seen that the machine tool to which the present invention is applied comprises essentially, the fixed base portion 15, a work supporting member 17 movable toward and from the base, a saddle portion movable in and out or transversely with respect to said parts and a table member on the saddle longitudinally shiftable as respects the preceding parts, this mechanism affording a substantial universal adjustment of the work table.

The essential movements just referred to are ordinarily capable of both hand and power adjustment, the hand adjustment devices including the crank arm or handle 115 couplable by clutch 27 with shaft 28 which thru bevel pinion 29 and gear 30 controls the elevation varying screw 18. Similarly, the hand wheel 31 is couplable thru clutch 32 with shaft 23 to rotate this shaft and its feed screw. The handle 33, at the end of the table serves for actuation of table adjusting screw and shaft 26.

Figure 13:
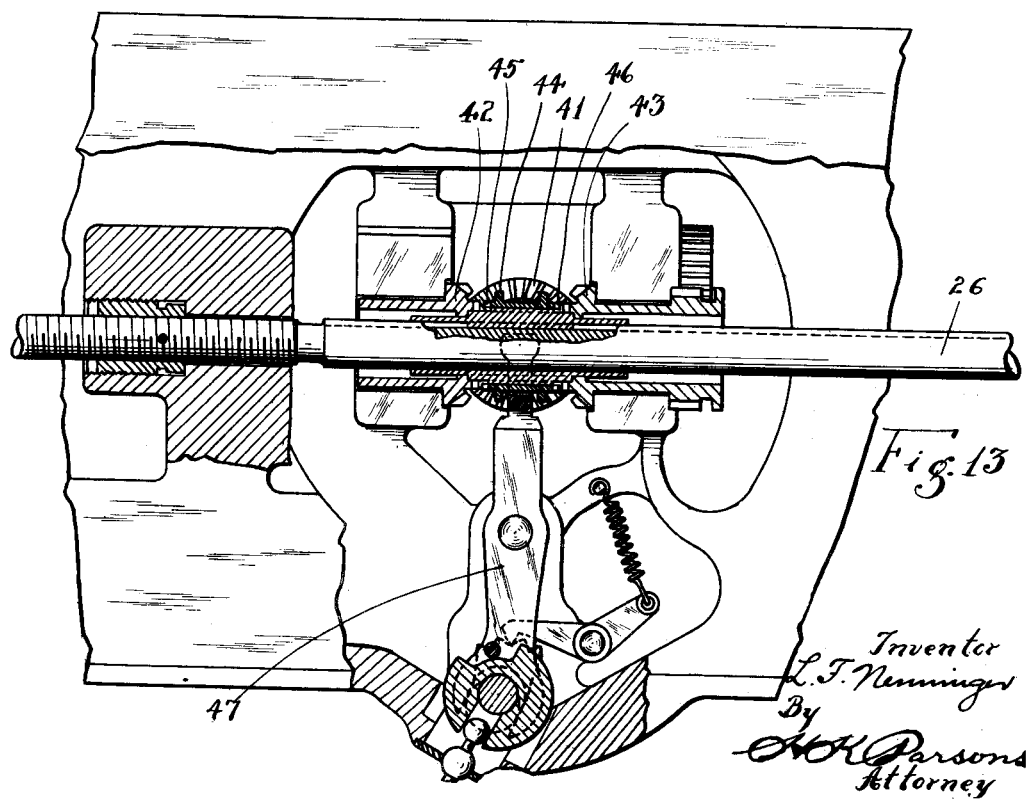
Figure 13 is a section on line 13—13 of Figure 12.

The power actuation of the parts in question will be best understood by reference to Figures 10, 12, and 13. Provided on suitable portion of the machine, as the knee 17, is the speed box 34 to which power from a prime mover is suitably applied, this speed box serving to vary the driving speed of the shift mechanisms as a whole and having as a part of its power transmission train, the drive gear 35.

This gear drives transmission gear 36 which is keyed on spline shaft 37, which is the final common driver for the several power movements of the machine.

This shaft projects in the branch transmission line for table movement particularly illustrated in connection with Figures 12 and 13, driving the pinion 38 meshing with gear 39 on shaft 40 which in turn has bevel gear 41 meshing with the pair of pinions 42 and 43 rotatably supported on shaft 26 and, it will be understood, driven in opposite directions. Slidably keyed to shaft 26 intermediate these pinions, is an actuation and direction controlling clutch spool 44 having clutch surfaces 45 and 46 for selective engagement with coacting clutch portions on the pinions 42 and 43. The position of this clutch spool is regulated by shift lever 47 on the front of the saddle which may be shifted to put the clutch spool in the neutral position indicated, or shifted to either right or left to engage the spool with the corresponding pinion to drive the table to the right or left as may be desired. This mechanism is illustrated in detail for example in Patent 1,315,722 and is not therefore further described in the present case.

Referring now to the main transmission lines shown in developed form in Figure 10, the gear 36 meshes with gear 48 rotatably mounted on bushing sleeve 49 carried by the stub shaft or spindle 50 so that gear 48 is constantly driven during operation of the power transmission line. A second gear 51 is also secured on and constantly driven with shaft 37 and serves thru reverser pinion 52 to constantly drive in the opposite direction gear 53 on bushing 49. Disposed intermediate gears 48 and 53 is the geared reverser sleeve 54 having the shifter groove 55 and the clutch portions 56 and 57 at opposite ends for selective engagement with co-acting clutch faces on gears 48 and 53. It will be seen that in intermediate or neutral position, the sleeve is out of engagement with both the clutch members but may be shifted as desired for selective engagement with either, being driven in opposite directions according to the gear member with which its clutch face is meshed. The member 54 has the intermediately located gear portion 58 in driving engagement with gear 59 on shaft 60 and gear 61 rotatably supported by shaft 37.

Shaft 60 is provided with gear 62 meshing with gear 63 on shaft 28 to operate said shaft and, thru gears 29 and 30, control vertical movement of the knee of the machine and is adapted to be operatively connected with transmission gear 59 by clutch spool 64.

Gear 61 has formed integral therewith, the reduced pinion portion 65 meshing with gear 66 loosely carried by shaft 23. A clutch spool member 67 keyed on shaft 23 is capable of shifting movement to operatively connect and disconnect the shaft with gear 66 for in and out adjustments of the saddle member with respect to the knee.

Referring now to the single lever control mechanism for effecting the various shifting movements of the reverser sleeve 54 and the clutch spools 64 and 67, particular attention is invited to Figures 4, 5, 6 and 9. By reference to these figures it will be seen that the various shifting mechanism shown in developed form in Figure 10 is disposed in a more compacted arrangement in a box or casing portion 68 in the front of the knee. It includes a supporting frame portion 69 having spaced bearing members 70 for the hinge pin 71 on which is pivoted a bracket 72 having a shift yoke 73 engaging the clutch spool 67 and an arm 74 bearing a pin 75 riding in groove 76 of the double groove barrel cam member 77. This cam member is secured on shaft 200 supported by the frame 69 and has a second groove 78 engaging the pin 79 of shift yoke 80, which has a second pin 81 engaged in the groove of clutch spool 64.

By reference particularly to Figures 4 and 6 it will be seen that oscillation of cam 77 will, on account of the engagement pins 75 and 81 in the grooves of the cam, alternatively shift the yoke members to interengage either the clutch of shaft 23 or the clutch of shaft 60 with gears 66 or 59, respectively. It will also be noted that the relative position of the lateral offsets of the two grooves is such that in one position of oscillation both clutches are out of engagement as illustrated, while in the other position one or the other will be brought into engagement and the other will be held out of engagement.

Accordingly, the mechanism in question operates selectively to properly effectively associate either the cross feed for the saddle or the vertical feed for the knee with the power driving transmission as outlined in connection with Figure 10 but to prevent both of said mechanisms being simultaneously operated.

To effect such shifting movements there is slidably mounted in the knee, the spindle member 82 having a plurality of circumferential grooves 83 providing rack teeth 84 which mesh with pinion 85 on cam shaft 200. Longitudinal shifting of the spindle will thus cause a rocking of the cam shaft and consequently thru the cams an appropriate interengagement or releasing of the several clutch devices. Rotatably secured to the front of the knee is the bracket 86 disposed coaxial with the spindle and having a pin 87 riding in slot 88 of the spindle to limit longitudinal movements thereof, and to properly connect said parts. This bracket has depending ears 89 between which is pivoted on spindle 90, the control handle or level 91. This handle has a rack segment 92 meshing with the rack 83 formed by the annular grooves 94 at the forward end of the spindle.

Movement of the handle about its pivot toward the left is indicated by the dotted lines in Figure 8, will cause the segment 92 by engagement with rack 94 to push the spindle 82 inward. This movement of the spindle inward or to the right, as shown in Figure 3 will shift rack 84 causing rotation of the pinion 85 in mesh therewith. This pinion is formed on shaft 97 of the double groove barrel cam member 77, so that rotation of the pinion will cause a corresponding rotation of the cam. As the cam rotates to proper position the groove therein will shift pin 79 forwardly from the position shown in Figure 6 and throwing in clutch member 64 to connect the vertical feed with the power transmission. Movement to the full line position of Figure 8 will shift the parts to the neutral position shown in Figure 6, while continued movement will throw in the upper clutch member. To retain the spindle and associate parts in any of these adjusted positions, it is provided with the station notches 95 indicated in dotted lines in Figure 4 for engagement by the spring actuated detent or pawl 96. In order that the reversal of direction of movement may be effected by the same control lever 91, the spindle at its forward portions is provided with a series of longitudinal extending grooves 97 forming the elongated pinion portion 98 which in any longitudinal adjustment meshes with the rack portions 99 of shift bar 100 and 101 of automatic control rod 102.

As indicated in Figure 5, rod 100 is transversely slidable in frame portion 69 and bears the shifter arms 152 engaged in the groove of reverser 54.

Oscillatory movement of the handle 91 forward from the position indicated in Figure 3, or in other words, forwardly and upwardly as indicated in the right hand dotted lines of Figure 7 will, by this oscillation of the spindle and pinion 98, transmit a longitudinal sliding motion to rack 99 shifting arm 152 and thus the reverser 54 to the left for the direct drive of either saddle or knee as may have been selectively engaged in the direction in which the handle was moved. That is to say, the handle being forward or up, if the drive for the knee has been selectively engaged, the motion of the knee will be upward. On the other hand, if the drive for the saddle has been engaged, the movement of the saddle, like the initial movement of the handle, will be in a forward direction or toward the operator. If the lever be depressed and swung inward, as indicated by the left hand dotted lines, the reverser will be moved to engage with the gear 53 of Figure 10 and the parts will be respectively moved downward and inward or away from the operator, according to the selective engagement which has been made.

It is to be understood that the lever may either be rocked to engage the cross or vertical feed and subsequently raised or depressed for the in and out or up and down movement or vice versa, as may be desired, and that operation of the machine is the joint result of the selective movements of the lever in the two above directions, the one movement being a rocking movement of the lever about its pivot producing an axial movement of the control spindle and the other being a joint oscillation of the lever and spindle about said axis. To prevent damage to the machine due to undue in and out or undue up and down power driven movements of the knee or the saddle, there is provided the control shaft 102, previously referred to. This shaft bears on its inner end, the double taper button head 103 adapted at its upward limit to contact with the adjustable taper stop 105 and at its lower limit with the reversely disposed lower adjustable stop 106. These stops are vertically adjustable on the column according to the limits of movements for the knee for particular work and both serve to engage and longitudinally shift the member 103 toward the right or left as the case may be. This shifting movement is transmitted thru rack 101 to pinion 98 which in turn moves the reverser sleeve into neutral position.

This rod also serves to produce a similar result as respects the in and out movement of the saddle upon the knee, in that the rod itself is provided with a pair of adjustable contact members or stops 107 and 108 disposed on opposite sides of the depending abutment lug 109 on the saddle. This lug, in its back and forth movement with the saddle, will tend to contact with either the member 107 or member 108 according to its direction of movement and will thus shift the rod 102 to throw the reverser clutch sleeve into neutral position, stopping the motion of the saddle. As indicated in Figures 3 and 9, the control spindle 82 has the station grooves 110 engageable by the spring pressed detent 111 for holding the spindle in the desired rotatably adjusted position.

From the foregoing description, the construction and operation of my improved simplified control of the shifting mechanisms of machine tools or the like should be readily understood. It will be seen that I make use of the single lever 91, which by a lateral swinging movement serves to engage either the cross or vertical feed, as desired, or by a directional movement controls the in and out, and the up and down movements of two of the adjustable work supporting devices, while an independent lever 47 serves to control the feeding movement of the work table itself past the tool or cutter, as normally supported by the column of the machine.

In this way, by the simplification of construction and employment of but two reversers in the machine and of but two control levers for the starting, stopping and three directional movements of the work members an extremely simplified control system for the power shifting of the work table and its supports, is provided.

I claim:

1. In a milling machine embodying a plurality of relatively movable parts including a shiftable support and a work holder reciprocable therewith along one axis of movement and relative thereto along a different axis of movement, the combination with independent final movers for each of said parts, of a power transmission couplable with said final movers, a joint reverser for the power transmission line to the final movers of a selected pair of said parts, means for selectively operatively associating either of said movers with said joint reverser, and a single control lever for actuating the reverser and the selective mechanism.

2. In a milling machine the combination with a stationary support, of a pair of members including a shiftable support and a work holder carried thereby, the shiftable support and work holder being mounted for joint movement relative the stationary support in one direction and one of the members being mounted for movement relative to the stationary support in the other direction, power transmission means carried by one of said members for effecting such movement, and a single control device associated with the power transmission and movable in one direction to selectively engage the power transmission with one of the movable members and in another direction to directionally actuate said member.

3. A milling machine including a knee and saddle, means for selectively shifting either of said parts, and a single control device movable in one direction to vary the selective actuation thereof and movable in an angularly related direction to control the directional actuation of the selectively determined moving part.

4. In mechanism of the character described, the combination with a milling machine base having a column rising therefrom, of a knee vertically movable on the column, a saddle carried by the knee and transversely movable with respect thereto, power means for effecting movements of the knee and of the saddle, independent clutches for connecting the knee and the saddle with said power mechanism and a selective cam controlling the actuation of said clutches.

5. In a machine tool organization, the combination with a bed or support, of a plurality of members carried thereby for movement relative to the support and a plurality of driven shafts for imparting movement to said parts, of driving means therefor, clutch members for selectively coupling the shafts and driving members, a cam for selectively actuating the clutch members, said cam having a pinion portion and a longitudinally shiftable control member having a rack meshing with the pinion for actuation of the same, said control member having a pinion portion, a rack meshing with the pinion portion thereof, a reverser for the power transmission actuatable by said rack, and a single control handle for longitudinally shifting and for oscillating the control member to actuate the reverser and the selective cam.

6. In a machine tool organization, the combination with a bed or support, of a plurality of members carried thereby for movement relative to the support and a plurality of driven shafts for imparting movement to said parts, of driving means therefor, clutch members for selectively coupling the shafts and driving members, a cam for selectively actuating the clutch members, said cam having a pinion portion, a longitudinally shiftable control member having a rack meshing with the pinion for actuation of the same, said control member having a pinion portion, a rack meshing with the pinion portion thereof, a reverser for the power transmission actuatable by said rack, a single control handle for longitudinally shifting and for oscillating the control member to actuate the reverser, and the selective cam, a rack member meshing with the pinion portion of the control member and means for automatically actuating said rack member upon predetermined movement of the parts shifted by the power mechanism.

7. A control device for the actuating mechanisms of a machine tool having a plurality of relatively movable parts including an oscillatable longitudinally shiftable control spindle, a coaxial bracket surrounding the spindle and connected therewith, means securing the bracket for rotative movement but against longitudinal movement and a control handle pivoted to the bracket for oscillation of the bracket, said handle having a segmental toothed head meshing with a rack portion on the spindle for longitudinally shifting the spindle as respects the bracket upon rocking movement of the handle and connections between the spindle and the drive for one of said parts whereby shifting of the spindle controls the actuation of said drive.

8. In mechanism of the character described, the combination with power transmission mechanism including selective and reversing clutches, of a single control member for both said clutches including an oscillatable longitudinally movable spindle having rack and pinion portions operatively coupled respectively with said clutch and reverser mechanisms, manual means for imparting both oscillatory and axial movements to the spindle to actuate said mechanisms and additional automatic means for imparting one of said movements thereto.

9. In a milling machine, the combination with a base of a vertically movable knee and a transversely movable part mounted thereon, power means for effecting said vertical and transverse movements, said means including a reverser clutch and a control for the clutch carried by the knee and projecting downwardly at an angle to the knee when in neutral position whereby downward and upward movements of the lever will cause corresponding movements of the knee and part thereon, substantially as described.

10. A machine of the character described including a vertically movable knee and a part movably mounted on the knee, final movers for the knee and for said part, power actuating means for said movements and a control lever transversely movable to selectively engage the power transmission with one of said movers and vertically oscillatable to control the direction of actuation thereof.

11. In a knee and column type milling machine, the combination with a vertically movable knee and a member shiftable on the knee, of final movers for both the said members, a power transmission line including a common reverser, and subsequent independent drives for the final movers including actuating clutches, a selective cam operatively associated with said clutches for rendering one inoperative when another is brought into operative position and a single control member permanently coupled with said cam and said reverser and shiftable in different directions for selectively actuating either the reverser or the cam and clutches.

12. In a knee and column type milling machine, the combination with a vertically movable knee and a member shiftable on the knee, of final movers for both the said members, a power transmission line including a common reverser and subsequent independent drives for the final movers including actuating clutches, a selective cam operatively associated with said clutches, for rendering one inoperative when another is brought into operative position, a single control member permanently coupled with said cam and said reverser and shiftable in different directions for selectively actuating either the reverser or the cam and clutches, an automatic shifter coupled with the control device, and adjustable means for actuating said shifter upon predetermined vertical or transverse movement of the parts.

13. In a machine tool embodying a support and a member movable on the support, a power transmission line for effecting said movement including a shiftable clutch member, a support for the clutch and associate parts of the transmission line, a pintle carried by the support, a bracket oscillatable on the pintle having a shifter yoke engaging the clutch and having an additional projecting arm, and a controlling cam having a portion engaging the arm whereby rotation of the cam will produce an oscillation of the arm, automatically shifting the clutch into and out of operative position, a shaft member operatively associated with the clutch and bearing a second clutch device and a manual actuating device having a clutch portion for interengagement therewith to rotate the shaft when the first mentioned clutch is in inoperative position.

14. In a machine tool, the combination with a plurality of shiftable members and power transmission, means for controlling the shifting thereof, of clutch devices intermediately disposed in the power transmission line, controlling members for the clutch devices including parallel members, certain of which are adapted for rotative and others for longitudinal adjustment, the longitudinally adjustable members being formed with rack portions and the rotatable member with a pinion portion, a control device supported adjacent said parts for both rotative and longitudinal adjusting movement, said control device having an elongated pinion meshing with rack members to permit of longitudinal adjustment of the control device and having circumferential grooves providing a series of annular rack teeth permitting of free rotation thereof with respect to the pinion, and means for imparting desired rotative and longitudinal adjusting means to the control device for predetermined shifting of the several clutches.

15. The combination with a milling machine including a vertically movable knee and a member mounted for movement thereon, of power means for raising and lowering the knee, power means for imparting back and forth movement to the member on the knee, and a single control device for selective coupling of either of said power means, said device being located adjacent the operator's station at the machine and being shiftable in one direction to cause an approach of the selectively actuated part to the operator and in a reverse direction to cause a receding movement of the selectively coupled part.

16. In a milling machine comprising a bed or support, a member mounted thereon for vertical movement and a second member supported for movement transversely with respect to the first, power means for actuating said members and a selective control device mounted for movement into one position to couple the power transmission with one of said movable parts and in another position to couple the power transmission with the other of said parts, said control device being additionally directionally movable to cause a corresponding directional actuation of either part previously selected thereby.

17. In a milling machine the combination with a supporting column of a knee vertically movable on the column, a second member supported by the knee for movement toward and from the column, power transmission means for shifting the parts including a driving member, individual power transmitting means for actuating the knee in either of two directions, additional means for actuating the member in either of two directions and a single control device for selectively coupling any of said elements with the source of power to determine the member actuated by said power source and the direction of actuation thereof.

18. In a milling machine the combination with a supporting column of a knee vertically movable on the column, a second member supported by the knee for movement toward and from the column, power transmission means for shifting the parts including a driving member, individual power transmitting means for actuating the knee in either of two directions, additional means for actuating the member in either of two directions and a single control device for selectively coupling any of said elements with the source of power to determine the member actuated by said power source and the direction of actuation thereof, said single control member being directionally actuable to automatically indicate the direction of movement of the selected part.

19. In mechanism of the character described, the combination with power shifting mechanism and work support members shiftable vertically and horizontally thereby, of a control lever for said power mechanism having a neutral angular position, means supporting the lever for movement from said position in a plurality of angularly related directions, clutch members for operatively connecting the power shifting mechanism with the individual work support members for imparting selected vertical or horizontal movement to said members, said clutches being selectively operable by the lever in its movement in said different directions, whereby said lever may be directionally moved to couple the power shifting mechanism with a work supporting member for shifting the member in a direction corresponding to that in which the lever is moved.

LESTER F. NENNINGER.